US009983608B2

(12) United States Patent
Yamanaka

(10) Patent No.: US 9,983,608 B2
(45) Date of Patent: May 29, 2018

(54) OUTPUT MODULE FOR PROGRAMMABLE CONTROLLER

(71) Applicant: FANUC Corporation, Yamanashi (JP)

(72) Inventor: Masashi Yamanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 373 days.

(21) Appl. No.: 14/809,721

(22) Filed: Jul. 27, 2015

(65) Prior Publication Data

US 2016/0028221 A1 Jan. 28, 2016

(30) Foreign Application Priority Data

Jul. 28, 2014 (JP) ................................. 2014-152796

(51) Int. Cl.
*H02H 9/00* (2006.01)
*G05F 1/625* (2006.01)

(52) U.S. Cl.
CPC .................................... *G05F 1/625* (2013.01)

(58) Field of Classification Search
USPC .............................................................. 361/18
See application file for complete search history.

(56) References Cited

U.S. PATENT DOCUMENTS 4,837,519 A * 6/1989 Lopetrone .............. G01R 27/18 324/528
4,996,625 A * 2/1991 Soma ..................... G03G 15/80 307/38
6,289,267 B1 * 9/2001 Alexander ............... H02H 3/00 700/286
2003/0155811 A1 8/2003 Yoneya
2004/0156154 A1 * 8/2004 Lazarovich .......... H02H 1/0015 361/42
2010/0060175 A1 * 3/2010 Lethellier .......... H05B 33/0815 315/164
2012/0319483 A1 * 12/2012 Scruggs ................ B60R 16/033 307/52
2013/0331955 A1 12/2013 Kwon
2014/0254050 A1 * 9/2014 Haines ............... G01R 31/3277 361/42
2015/0271884 A1 * 9/2015 Kim ................... H05B 33/0824 315/153
2015/0355262 A1 * 12/2015 Hu ........................... H02H 3/16 324/509

FOREIGN PATENT DOCUMENTS

CN 103488115 A 1/2014
JP 53-15494 U 2/1978
(Continued)

OTHER PUBLICATIONS

Decision to Grant a Patent in JP Application No. 2014-152796, dated Dec. 27, 2016.
(Continued)

*Primary Examiner* — Ronald W Leja
(74) *Attorney, Agent, or Firm* — Hauptman Ham, LLP

(57) ABSTRACT

An output module for programmable controller includes an output common output circuit that supplies load current to each of the load output circuits, and the control circuit controls ON/OFF of the output common output circuit in accordance with an instruction from the higher-level device.

6 Claims, 8 Drawing Sheets

(56) References Cited

FOREIGN PATENT DOCUMENTS

| | | | |
|---|---|---|---|
| JP | S63-88607 | A | 4/1988 |
| JP | 2003-150244 | A | 5/2003 |
| JP | 2003-244781 | A | 8/2003 |
| JP | 2012-198841 | A | 10/2012 |
| KR | 93-5708 | B1 | 6/1993 |

OTHER PUBLICATIONS

Office Action in CN Application No. 201510451366.5, dated Oct. 10, 2017, 12 pages.

* cited by examiner

OUTPUT MODULE FOR PROGRAMMABLE CONTROLLER

RELATED APPLICATIONS

The present application claims priority to Japanese Application Number 2014-152796, filed Jul. 28, 2014, the disclosure of which is hereby incorporated by reference herein in its entirety.

BACKGROUND OF THE INVENTION

1. Field of the Invention

The present invention relates to an output module equipped with an ON/OFF function for output common, and particularly relates to an output module for programmable controller to control the sequence of a machine.

2. Description of the Related Art

A programmable controller is a device to control the operation of a NC machine tool in accordance with predetermined sequence. The programmable controller includes a memory that stores instructions to execute various functions, including sequence, timing and operational expression, and is built in a numerical control device. A sequence program for the programmable controller is to create the procedure of operation to be performed by a CPU in the form of a ladder diagram, and is converted into a machine language instruction by a Programmable Machine Controller (PMC) programmer equipped with a program creation function and is then stored in the memory.

An output module for such a programmable controller includes: a control circuit that receives an instruction from a higher-level device and turns ON/OFF load output circuits; the load output circuits that receive an ON/OFF instruction from the control circuit to control current flowing through a load connected; and an output common that is externally connected to a power supply for load and supplies load current to each of the load output circuits. Each of the load output circuits includes a terminal connected to a corresponding load and a terminal connected to the power supply for load. While a plurality of the load output circuits are typically prepared to control a plurality of loads, the load output circuits share one common terminal in many cases that is connected to the power supply for load so as to reduce the number of terminals.

FIG. 8 schematically shows a conventional output module. Reference numeral 10 denotes an output module, which internally includes a plurality of load output circuits 40 (40*a* to 40*n*). Each load output circuit 40 includes an output terminal 50 that can be connected to an external load 42. The output module has an output common terminal 60 apart from the output terminals 50, and the output common terminal 60 can be connected to an external power supply for load 80. This output common terminal 60 is to reduce the number of terminals, and if power supplies for load are individually provided for the load output circuits 40, they will make the structure of the output module complicated. That is why they are connected as the output common terminal 60 collectively to the power supply for load 80 to reduce the number of terminals, so that the output common terminal 60 and each of the load output circuits 40 (40*a* to 40*n*) are connected to supply power to these load output circuits 40.

The output module 10 internally includes a control circuit 30 as well. The output module 10 is then connected to a higher-level device 70, from which an ON/OFF instruction of the load output circuits 40 is issued to the control circuit 30. Receiving such an instruction, the control circuit 30 then issues an ON/OFF instruction to each of the load output circuits 40.

An open/close mechanism 92 is disposed between the output common terminal 60 and the power supply for load 80, and the open/close mechanism 92 is connected to an external device 90, from which an ON/OFF control instruction is issued, whereby load current is allowed to flow or interrupted between the output common terminal 60 and the power supply for load 80.

In such an output module 10, if an abnormal situation or an unexpected control state happens, all of the load output circuits have to be turned OFF at the same time in some cases. Then, an instruction is issued from the higher-level device 70 to the control circuit 30 so as to turn OFF each of the load output circuits 40, and each of the load output circuits 40 stops the output in response to the instruction from the control circuit 30, or the open/close mechanism 92 of the output common terminal 60 interrupts the load current to the output common terminal 60, for example.

JP S63-88607 A discloses a technique relating to an output unit for sequence controller that is configured so that a signal from an external CPU unit is output to an output circuit via an interface.

The technique disclosed in JP S63-88607 A, however, has the following risk. That is, since it does not include any special device to interrupt the continuity between the external power supply for load and the output common terminal, if all of the load output circuits have to be turned OFF at the same time due to an abnormal situation or an unexpected control state as described for the conventional technique, an instruction for turning OFF has to be issued from the CPU unit to each of the output circuits, which may make a control program from the CPU complicated and may increase the capacity of the program.

In the conventional output module illustrated in FIG. 8, one method to turn OFF all of the load output circuits 40 at the same time includes to send an instruction from the higher-level device 70 to the control circuit 30 to turn OFF each of the load output circuits 40 so as to allow each of the load output circuits 40 to stop the output in response to the instruction from the control circuit 30. Similarly to the technique disclosed in JP S63-88607 A, this method also has the risk of making a control program from the higher-level device 70 complicated and increasing the capacity of the program.

As another means, load current to the output common terminal 60 may be interrupted by the open/close mechanism 92 of the output common terminal. However, this requires the external device 90 to open/close the output common terminal 60 and its control means to be provided separately.

SUMMARY OF THE INVENTION

Then the present invention aims to provide an output module that does not make a control program of a higher-level device complicated and allows load output circuits to be disconnected at the same time without any device provided separately.

An output module for programmable controller according to the present invention includes: a control circuit configured to receive an instruction from a higher-level device; load output circuits configured to receive an ON/OFF instruction from the control circuit and control current flowing through a load connected; and an output common terminal, to which an external power supply for load configured to supply load current to each of the load output circuits is configured to be connected. The output module further includes an output common output circuit configured to supply load current to each of the load output circuits, and the control circuit is configured to control ON/OFF of the output common output circuit in accordance with an instruction from the higher-level device.

The output module includes the output common output circuit that supplies load current to each of the load output circuits, and the control circuit controls ON/OFF of the output common output circuit. With this configuration, there is no need to send a turning-OFF instruction to each of the load output circuits individually, and a turning-OFF signal simply may be sent to the output common output circuit. This can turn OFF all of the load output circuits without making a control program of the higher-level device for turning-OFF complicated or without increasing the program capacity.

The output module for programmable controller further may include a terminal, to which an external device is connected, the external device outputs a control signal to turn ON/OFF for the output common output circuit.

The output module for programmable controller includes the terminal, to which an external device can be connected, the external device receiving a control signal to turn ON/OFF of the output common output circuit. This configuration allows an external device to be connected as needed, the external device receiving a control signal to turn ON/OFF of the output common output circuit, and so the conventional control scheme can be used continuously.

The output common output circuit may internally include a monitoring circuit configured to monitor a voltage value and a current value at an ON time.

Such an output common output circuit internally including a monitoring circuit enables monitoring of the output common output circuit, and so safety of the system can be improved.

When overvoltage, disconnection to a power supply, overcurrent or ground fault occurs at the output common output circuit, the monitoring circuit may transmit a status of the output common output circuit to the control circuit, and the control circuit may transmit the status of the output common output circuit to the higher-level device.

When overvoltage, disconnection to a power supply, overcurrent or ground fault occurs at the output common output circuit, the monitoring circuit may transmit a status of the output common output circuit to the external device and the control circuit, and the control circuit may transmit the status of the output common output circuit to the higher-level device.

The monitoring circuit transmits a status of the output common output circuit to the external device and the control circuit for monitoring, and so safety of the system can be improved.

The output common output circuit may internally include an forcible-OFF circuit to turn OFF the output common output circuit forcibly, and when overvoltage, disconnection to a power supply, overcurrent or ground fault occurs at the output common output circuit, the monitoring circuit may transmit a status of the output common output circuit to the control circuit, the control circuit may transmit the status of the output common output circuit to the higher-level device, and the forcible-OFF circuit may turn OFF the output common output circuit forcibly.

The output common output circuit may internally include an forcible-OFF circuit to turn OFF the output common output circuit forcibly, and when overvoltage, disconnection to a power supply, overcurrent or ground fault occurs at the output common output circuit, the monitoring circuit may transmit a status of the output common output circuit to the external device and the control circuit, the control circuit may transmit the status of the output common output circuit to the higher-level device, and the forcible-OFF circuit may turn OFF the output common output circuit forcibly.

The output common output circuit internally includes an forcible-OFF circuit to turn OFF the output common output circuit itself forcibly, and when overvoltage, not-connected to a power supply, overcurrent or ground fault occurs at the output common output circuit, the forcible-OFF circuit itself can turn OFF the output common output circuit forcibly. This configuration enables forcible turning-OFF by the output common output circuit itself. Then if abnormality occurs, there is no need to transmit the status to the higher-level device or the external device and wait for an OFF instruction, and so the power supply to the load output circuits can be stopped more speedily. Further, the status of the output common output circuit can be transmitted to the higher-level device and the external device for monitoring, and so the safety of the system can be improved.

The present invention can provide an output module that does not make a control program of a higher-level device complicated and allows load output circuits to be disconnected at the same time without any device provided separately.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

First Embodiment

Figure 1:
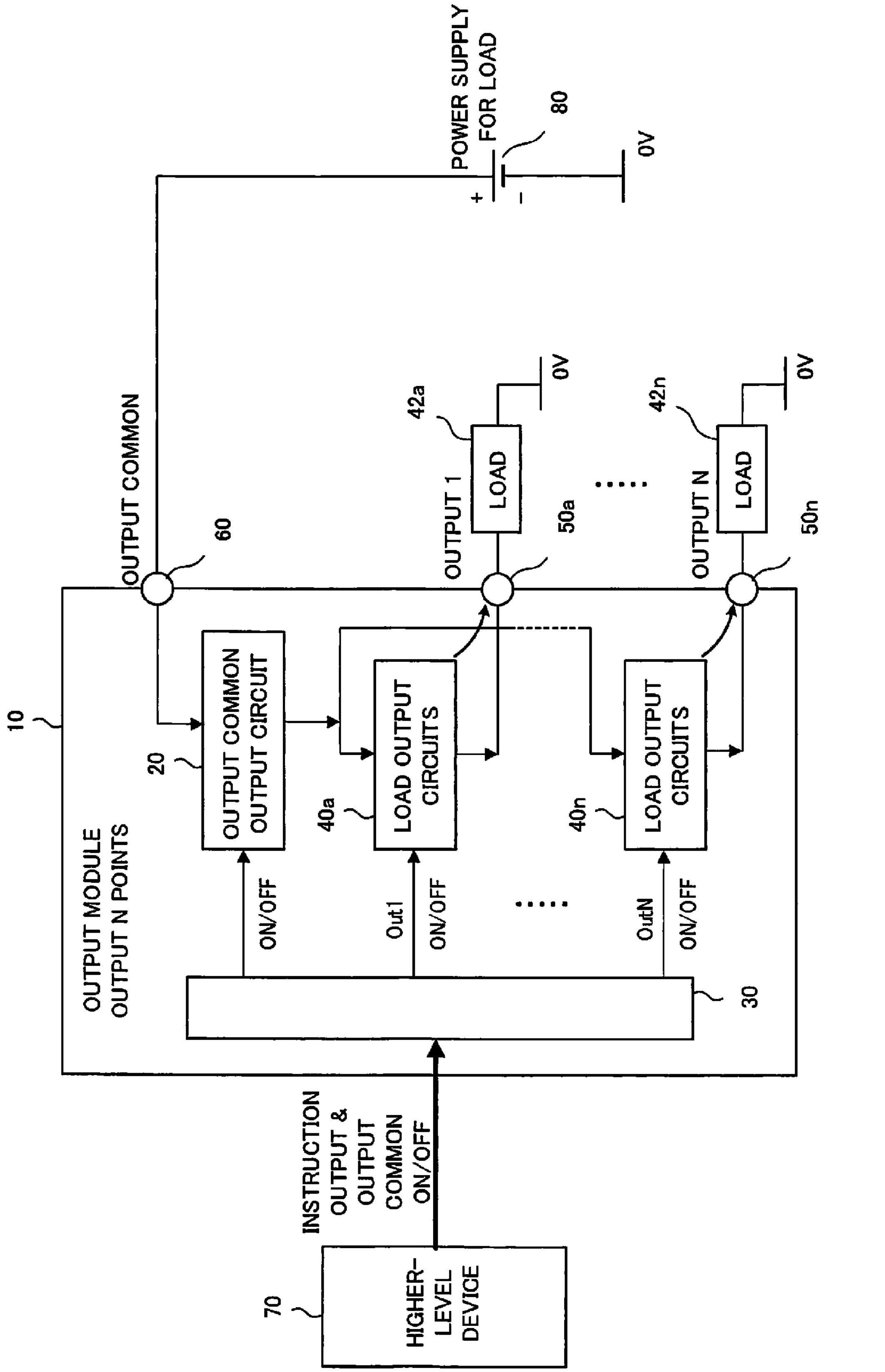
FIG. 1 schematically illustrates an output module of a first embodiment.

The following describes embodiments of the present invention, with reference to the drawings. The same reference numerals are assigned to the configuration similar to the conventional output module, and their descriptions are omitted. FIG. 1 schematically illustrates an output module of the present embodiment.

Figure 8:
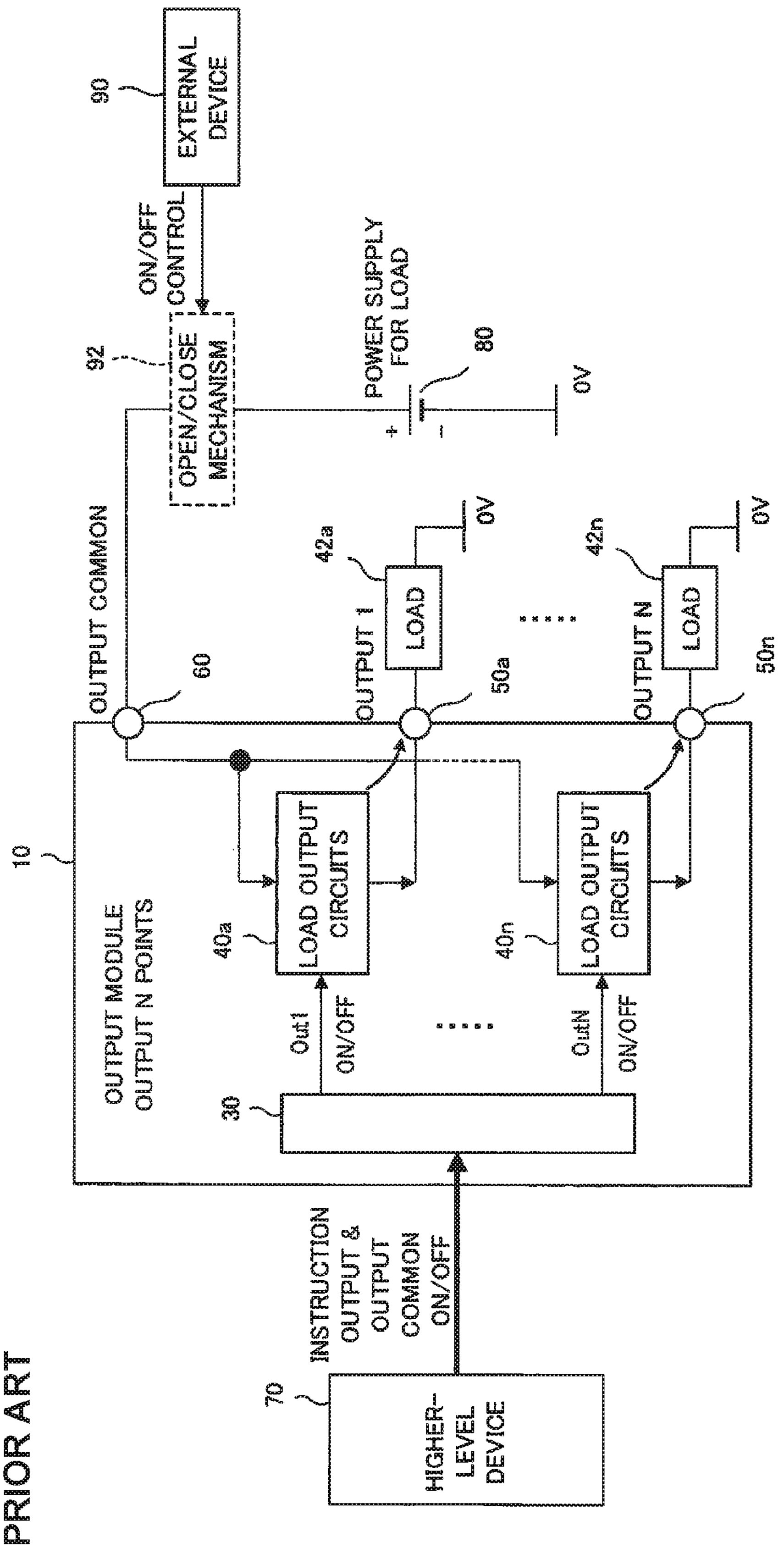
FIG. 8 PRIOR ART
FIG. 8 schematically illustrates a conventional output module.

The output module of the present embodiment differs from the conventional output module illustrated in FIG. 8 in that it does not include the external device 90 and the open/close mechanism 92 disposed between the power supply for load 80 and the output common terminal 60, but includes an output common output circuit 20 in the output module 10. The output common output circuit 20 is connected to the output common terminal 60, to which the power supply for load 80 is connected, and the output of the output common output circuit is connected to each load output circuit 40.

The output common output circuit 20 is connected to the control circuit 30 as well, and the control circuit 30 can issue an ON/OFF instruction to the output common output circuit 20 as well in a similar manner to the issuance of an ON/OFF instruction to each of the load output circuits 40. Similarly to the conventional output module, the control circuit 30 is connected to the higher-level device 70, and the higher-level device 70 can issue an ON/OFF instruction to each of the load output circuits 40 and the output common output circuit 20 via the control circuit 30.

In the thus configured present embodiment, the higher-level device 70 can issue an ON/OFF instruction to the output common output circuit 20 via the control circuit 30. This allows the higher-level device 70 to issue an OFF instruction simply to the output common output circuit 20 without the necessity of issuing an instruction to turn OFF each of the load output circuits 40 via the control circuit as in the conventional technique if all of the load output circuits have to be turned OFF at the same time due to an abnormal situation or an unexpected control state. Turning OFF of the output common output circuit 20 can interrupt of the power supply from the power supply for load 80 to each of the load output circuits 40, meaning that all of the load output circuits 40 can be turned OFF.

Second Embodiment

Figure 2:
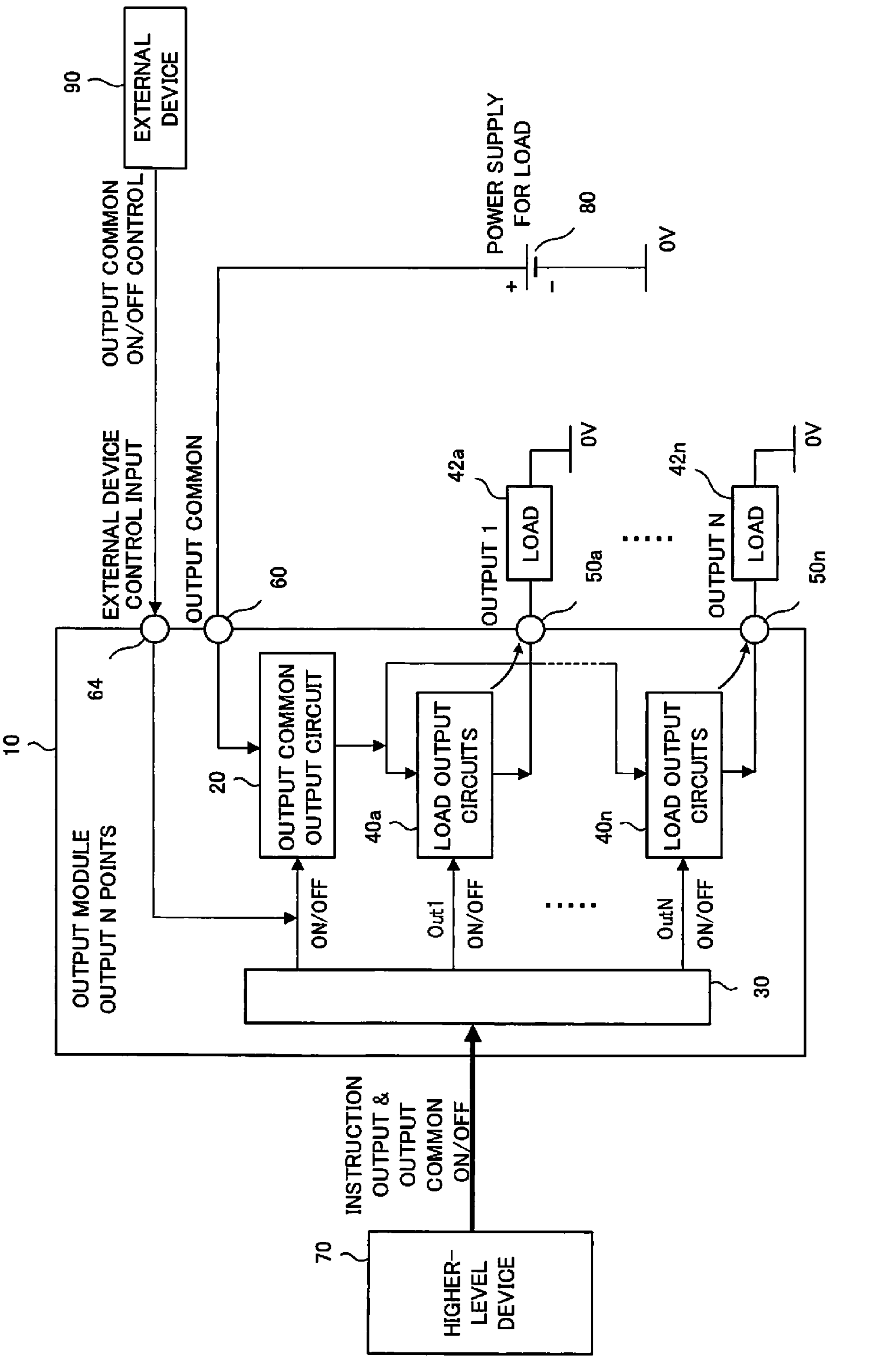
FIG. 2 schematically illustrates an output module of a second embodiment.

FIG. 2 schematically illustrates an output module of the present embodiment. The output module of the present embodiment differs from the output module of the first embodiment illustrated in FIG. 1 in that the output module 10 includes an external device control input terminal 64, to which the external device 90 to ON/OFF control the output common output circuit 20 can be connected. Then in response to an instruction from the external device 90 connected to the external device control input terminal 64, an ON/OFF instruction is issued to the output common output circuit for ON/OFF control of the output common output circuit 20, and accordingly the load output circuits 40 are ON/OFF controlled collectively.

In the thus configured present embodiment, similarly to the first embodiment, the higher-level device 70 can issue an ON/OFF instruction to the output common output circuit 20 via the control circuit 30. Additionally, in response to an operation of the external device 90 connected to the external device control input terminal 64, an ON/OFF instruction can be issued to the output common output circuit 20.

This allows an ON/OFF instruction to be issued to each of the load output circuits 40 via the output common output circuit 20 in accordance with an instruction from the external device 90.

Third Embodiment

Figure 3:
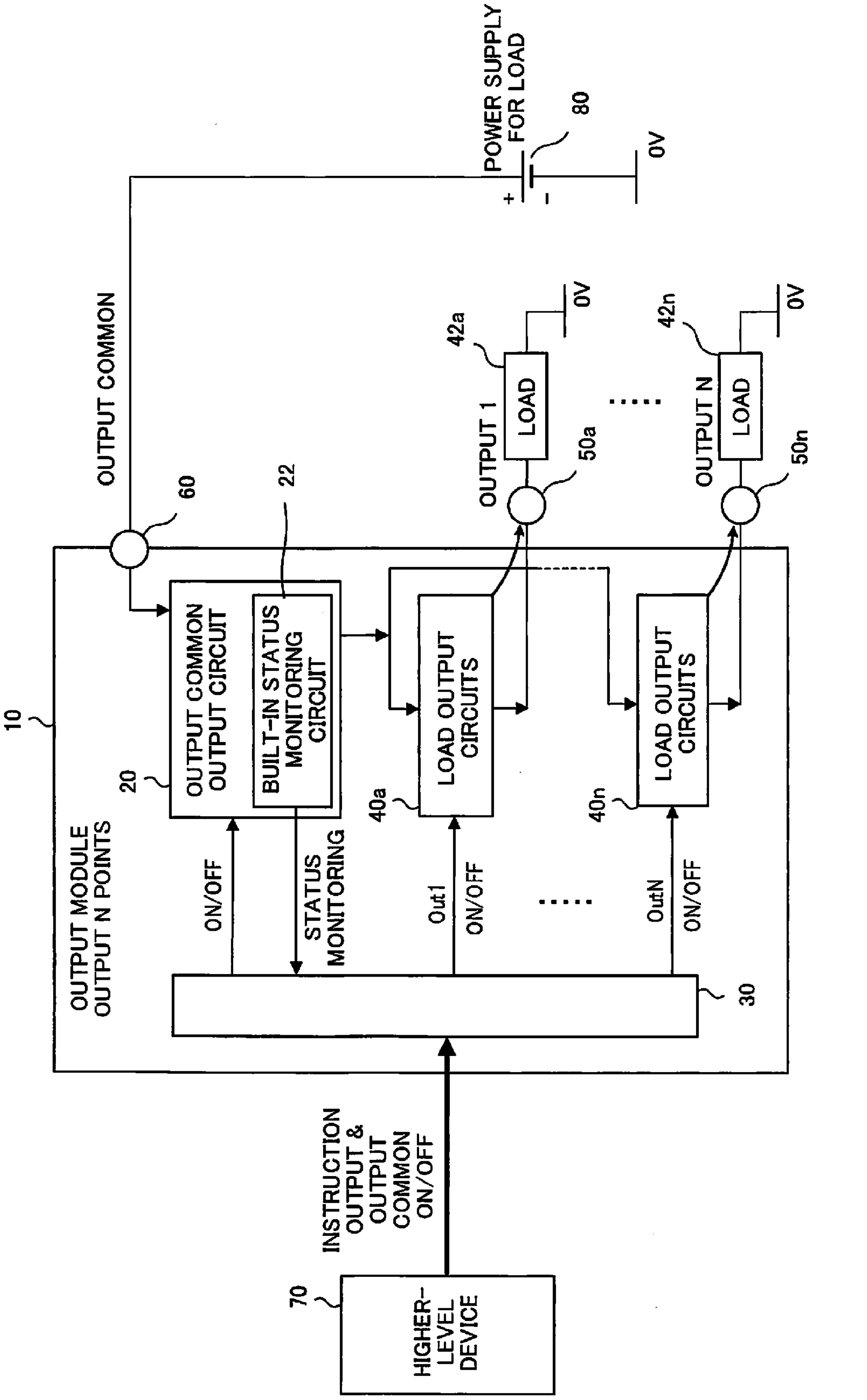
FIG. 3 schematically illustrates an output module of a third embodiment.

FIG. 3 schematically illustrates an output module of the present embodiment. The output module of the present embodiment differs from the output module of the first embodiment illustrated in FIG. 1 in that the output common output circuit 20 internally includes a status monitoring circuit 22 to monitor a voltage value and a current value when the output common output circuit 20 is in ON state.

In the thus configured present embodiment, similarly to the first embodiment, the higher-level device 70 can issue an ON/OFF instruction to the output common output circuit 20 via the control circuit 30. Additionally, the status monitoring circuit 22 can monitor a voltage value and a current value of the output common output circuit 20 when the output common output circuit 20 is in ON state. This enables monitoring of the status of the output common output circuit 20 in ON state, and so can improve the safety of the system.

Fourth Embodiment

Figure 4:
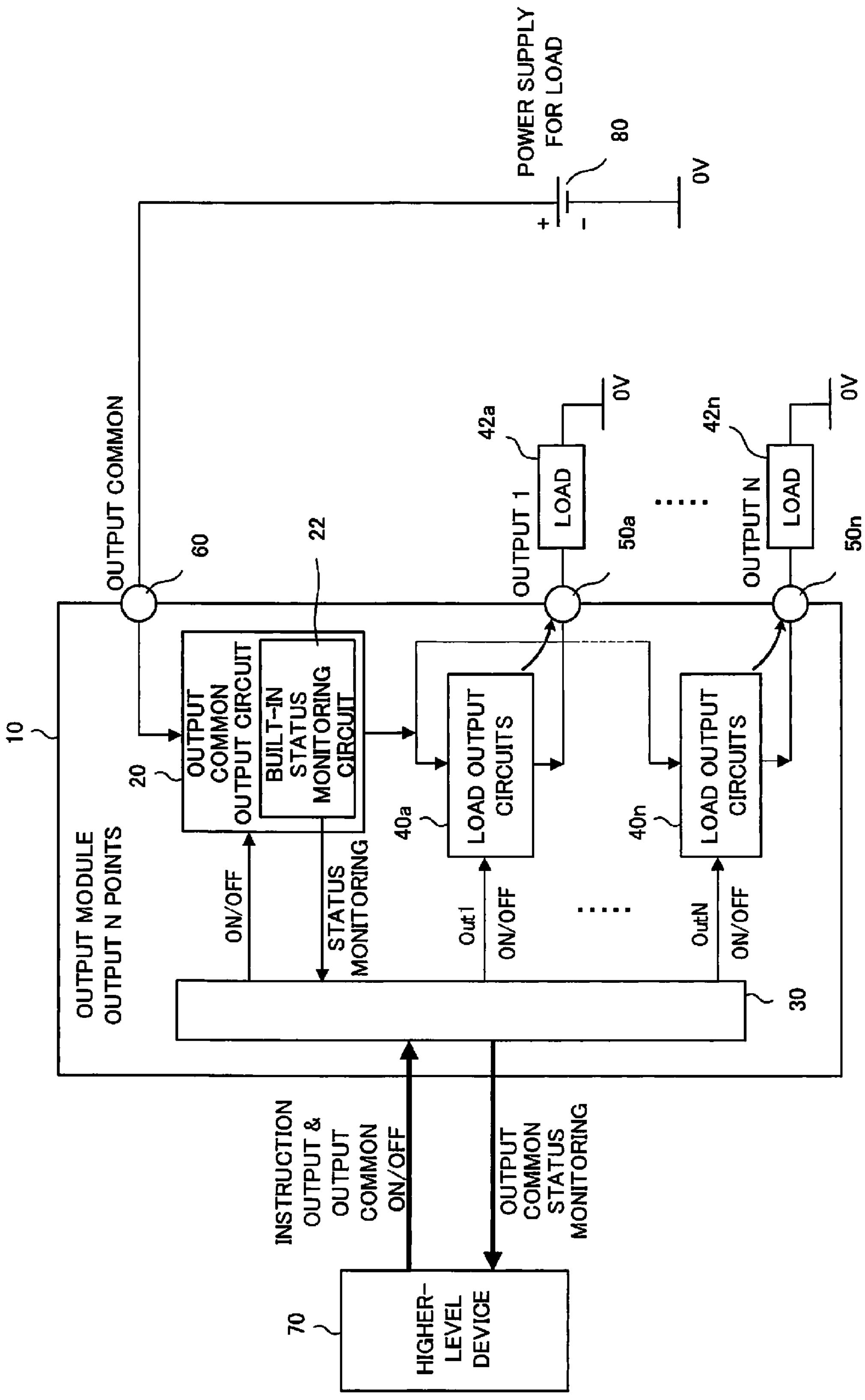
FIG. 4 schematically illustrates an output module of a fourth embodiment.

FIG. 4 schematically illustrates an output module of the present embodiment. The output module of the present embodiment differs from the output module of the third embodiment illustrated in FIG. 3 in that the status monitoring circuit 22 internally included in the output common output circuit 20 sends a status of the output common output circuit 20, such as a voltage value and a current value at the ON time of the output common output circuit 20, to the control circuit 30, and the control circuit 30 receiving the status of the output common output circuit 20 sends the status of the output common output circuit 20 to the higher-level device 70.

The thus configured present embodiment can transmit the status of the output common output circuit 20 in ON state from the status monitoring circuit 22 internally included in the output common output circuit 20 to the control circuit 30 and the higher-level device 70, and so if abnormality occurs especially at the output common output circuit 20, such as overvoltage, disconnection to the power supply, overcurrent or ground fault, such a status can be transmitted to the control circuit 30 or the higher-level device 70, and so the higher-level device 70 can monitor the status of the output common output circuit 20. If abnormality occurs at the output common output circuit 20, the higher-level device 70 can monitor such a status, so that the higher-level device can issue an OFF instruction to the output common output circuit 20 more appropriately, and so the safety of the system can be improved.

Fifth Embodiment

Figure 5:
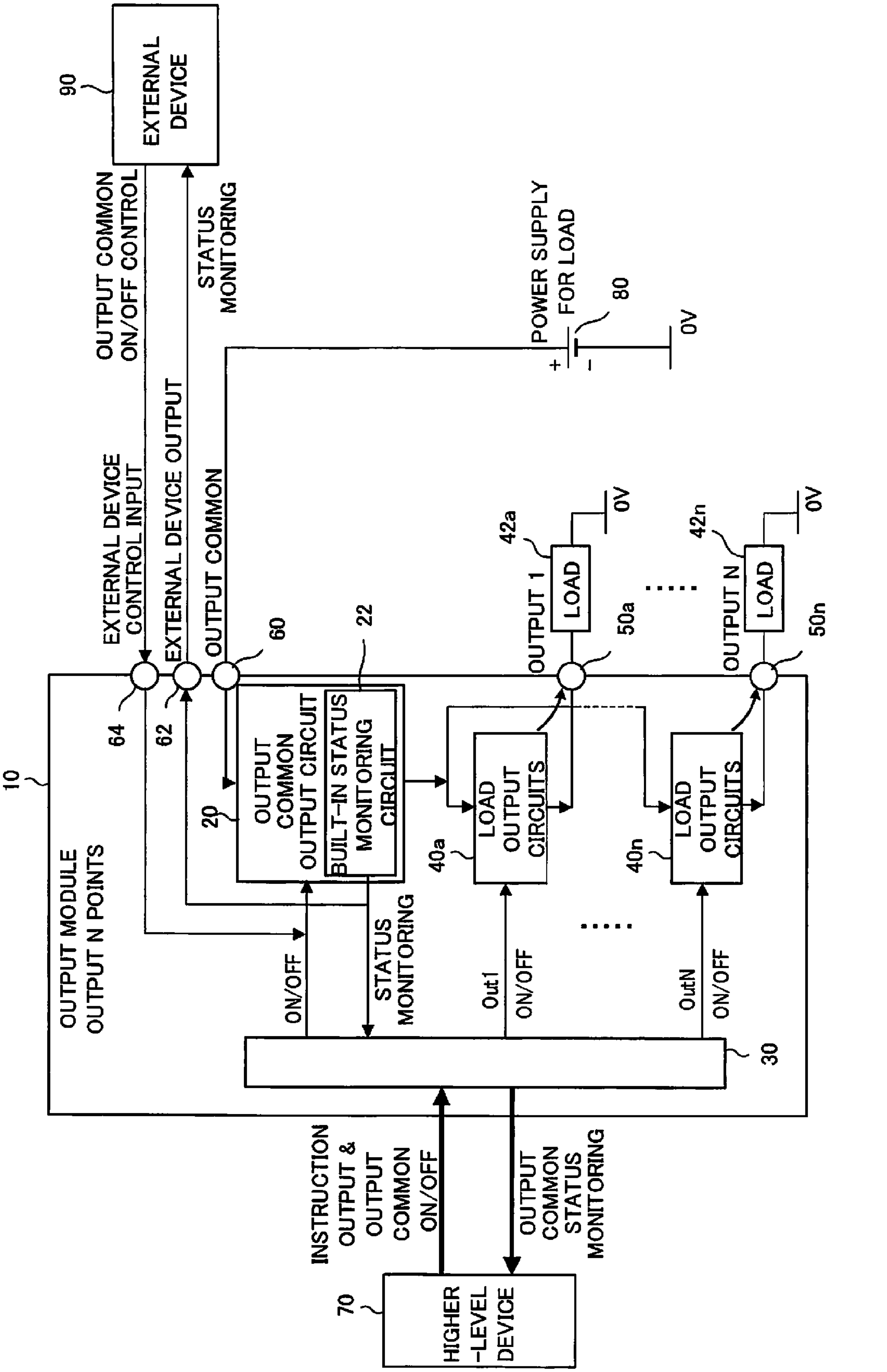
FIG. 5 schematically illustrates an output module of a fifth embodiment.

FIG. 5 schematically illustrates an output module of the present embodiment. The output module of the present embodiment differs from the output module of the second embodiment illustrated in FIG. 2 in that the output module 10 has an external device output terminal 62, and a status monitoring circuit 22 internally included in the output common output circuit 20 sends a status of the output common output circuit 20 to the control circuit 30 or the external device connected to the external device output terminal 62, and the control circuit 30 receiving the status of the output common output circuit 20 sends the status of the output common output circuit 20 to the higher-level device 70.

The thus configured present embodiment can transmit the status of the output common output circuit 20 in ON state from the status monitoring circuit 22 internally included in the output common output circuit 20 to the control circuit 30, the higher-level device 70, and the external device 90. If abnormality occurs especially at the output common output circuit 20, such as overvoltage, disconnection to the power supply, overcurrent or ground fault, such a status can be transmitted to the control circuit 30, the higher-level device 70, or the external device 90, and so the higher-level device 70 and the external device 90 can monitor the status of the output common output circuit 20. If abnormality occurs at the output common output circuit 20, both of the higher-level device 70 and the external device 90 can monitor such a status, so that an OFF instruction can be issued more appropriately to the output common output circuit 20, and so the safety of the system can be improved.

Sixth Embodiment

Figure 6:
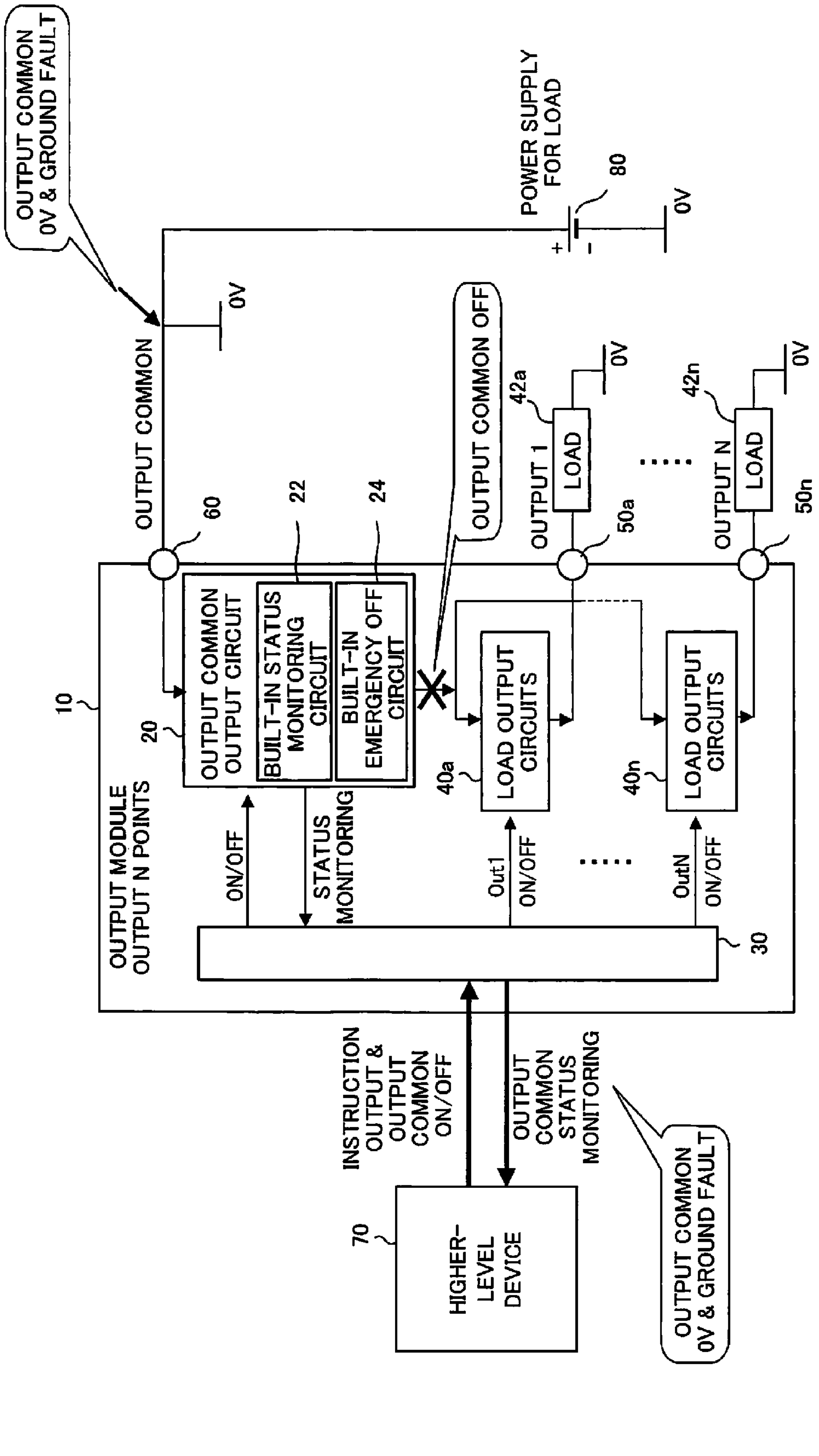
FIG. 6 schematically illustrates an output module of a sixth embodiment.

FIG. 6 schematically illustrates an output module of the present embodiment. The output module of the present embodiment differs from the output module of the fourth embodiment illustrated in FIG. 4 in that the output common output circuit 20 internally includes an emergency OFF circuit 24 to enable forcible turning-OFF of the output common output circuit 20 itself.

The thus configured present embodiment enables forcible turning-OFF of the output common output circuit 20 as needed because of the emergency OFF circuit 24 internally included in the output common output circuit 20. If abnormality occurs especially at the output common output circuit 20, such as overvoltage, disconnection to the power supply, overcurrent or ground fault, the output common output circuit 20 itself can turn OFF the output common output circuit 20 forcibly, and there is no need to transmit the status to the higher-level device 70 and wait for an OFF instruction when abnormality occurs, and so the power supply to the load output circuits 40 can be stopped more speedily. Further, the status of the output common output circuit 20 can be transmitted to the higher-level device 70 for monitoring, and so the safety of the system can be improved.

Seventh Embodiment

Figure 7:
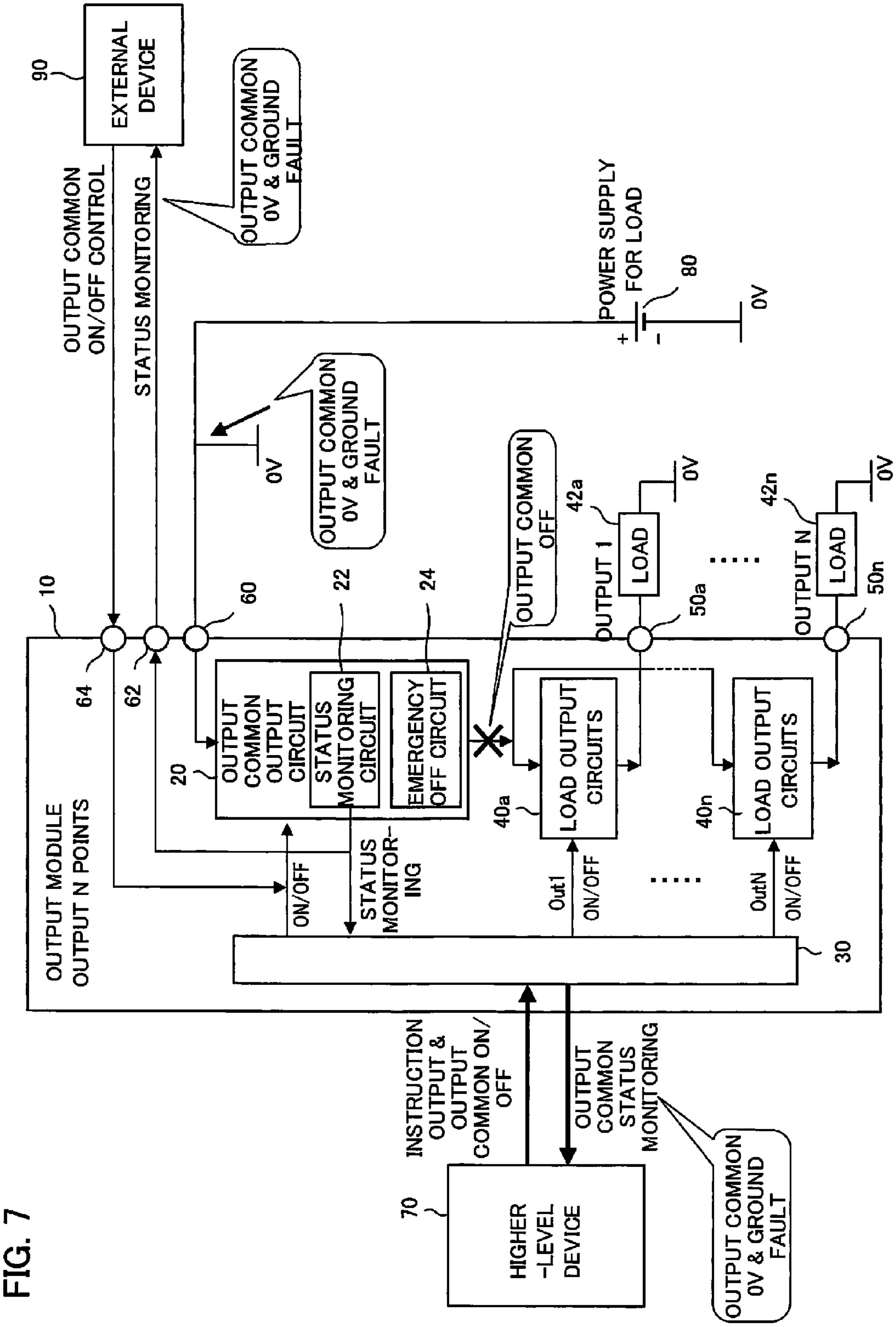
FIG. 7 schematically illustrates an output module of a seventh embodiment.

FIG. 7 schematically illustrates an output module of the present embodiment. The output module of the present embodiment differs from the output module of the fifth embodiment illustrated in FIG. 5 in that the output common output circuit 20 internally includes an emergency OFF circuit 24 to enable forcible turning-OFF of the output common output circuit 20 itself.

The thus configured present embodiment enables forcible turning-OFF of the output common output circuit 20 as needed because of the emergency OFF circuit 24 internally included in the output common output circuit 20. If abnormality occurs especially at the output common output circuit 20, such as overvoltage, disconnection to the power supply, overcurrent or ground fault, the output common output circuit 20 itself can turn OFF the output common output circuit 20 forcibly, and there is no need to transmit the status to the higher-level device 70 and the external device 90 and wait for an OFF instruction when abnormality occurs, and so the power supply to the load output circuits 40 can be stopped more speedily. Further, the status of the output common output circuit 20 can be transmitted to the higher-level device 70 and the external device 90 for monitoring, and so the safety of the system can be improved.

The invention claimed is:

1. An output module for a programmable controller, the output module comprising:

a control circuit configured to receive an instruction from a higher-level device;

load output circuits configured to receive an ON/OFF instruction from the control circuit and control current flowing through a load connected; and an output common terminal, to which an external power supply for load configured to supply load current to each of the load output circuits is configured to be connected, wherein the output module further includes an output common output circuit configured to supply load current to each of the load output circuits, the control circuit is configured to control ON/OFF of the output common output circuit in accordance with an instruction from the higher-level device, the output common output circuit internally includes a monitoring circuit configured to monitor a voltage value and a current value at an ON time, and the monitoring circuit is configured to transmit a status of the output common output circuit to the control circuit.

2. The output module according to claim 1, further comprising:

a terminal, to which an external device is configured to be connected, wherein the external device is configured to output a control signal to turn ON/OFF for the output common output circuit.

3. The output module according to claim 2, wherein the output common output circuit internally includes an forcible-OFF circuit to turn OFF the output common output circuit forcibly, and when overvoltage, disconnection to a power supply, overcurrent or ground fault occurs at the output common output circuit, the monitoring circuit is configured to transmit the status of the output common output circuit to the external device and the control circuit, the control circuit is configured to transmit the status of the output common output circuit to the higher-level device, and the forcible-OFF circuit is configured to turn OFF the output common output circuit forcibly.

4. The output module according to claim 1, wherein the output common output circuit internally includes an forcible-OFF circuit to turn OFF the output common output circuit forcibly, and when overvoltage, disconnection to a power supply, overcurrent or ground fault occurs at the output common output circuit, the monitoring circuit is configured to transmit the status of the output common output circuit to the control circuit, the control circuit is configured to transmit the status of the output common output circuit to the higher-level device, and the forcible-OFF circuit is configured to turn OFF the output common output circuit forcibly.

5. An output module for programmable controller, comprising:

a control circuit configured to receive an instruction from a higher-level device;

load output circuits configured to receive an ON/OFF instruction from the control circuit and control current flowing through a load connected; and an output common terminal, to which an external power supply for load configured to supply load current to each of the load output circuits is configured to be connected, wherein the output module further includes an output common output circuit configured to supply load current to each of the load output circuits, the control circuit is configured to control ON/OFF of the output common output circuit in accordance with an instruction from the higher-level device, the output common output circuit internally includes a monitoring circuit configured to monitor a voltage value and a current value at an ON time, and when overvoltage, disconnection to a power supply, overcurrent or ground fault occurs at the output common output circuit, the monitoring circuit transmits a status of the output common output circuit to the control circuit, and the control circuit transmits the status of the output common output circuit to the higher-level device.

6. An output module for programmable controller, comprising:

a control circuit configured to receive an instruction from a higher-level device;

load output circuits configured to receive an ON/OFF instruction from the control circuit and control current flowing through a load connected; and an output common terminal, to which an external power supply for load configured to supply load current to each of the load output circuits is configured to be connected, wherein the output module further includes an output common output circuit configured to supply load current to each of the load output circuits, the control circuit is configured to control ON/OFF of the output common output circuit in accordance with an instruction from the higher-level device, the output module further comprises a terminal, to which an external device is configured to be connected, and the external device is configured to output a control signal to turn ON/OFF for the output common output circuit, the output common output circuit internally includes a monitoring circuit configured to monitor a voltage value and a current value at an ON time, and when overvoltage, disconnection to a power supply, overcurrent or ground fault occurs at the output common output circuit, the monitoring circuit transmits a status of the output common output circuit to the external device and the control circuit, and the control circuit transmits the status of the output common output circuit to the higher-level device.

* * * * *